W. McC. THURSBY.
LUBRICATOR.
APPLICATION FILED APR. 21, 1921.

1,388,672.

Patented Aug. 23, 1921.

Wm. McC. Thursby
INVENTOR.

BY

Egerton R. Case
ATTORNEY.

UNITED STATES PATENT OFFICE.

WILLIAM McCRAE THURSBY, OF WATROUS, SASKATCHEWAN, CANADA.

LUBRICATOR.

1,388,672. Specification of Letters Patent. Patented Aug. 23, 1921.

Application filed April 21, 1921. Serial No. 463,271.

*To all whom it may concern:*

Be it known that I, WILLIAM McCRAE THURSBY, a subject of the King of Great Britain, residing at Watrous, Province of Saskatchewan, Canada, have invented certain new and useful Improvements in Lubricators, of which the following is a specification.

My invention relates to improvements in lubricators, and the object of the invention is to provide an article of the class set forth, certain movable parts of which will not slacken off through use, thus avoiding loss, and in the following specification I shall set forth my preferred construction, and what I claim as new will be set forth in the claims forming part thereof.

Figure 1:
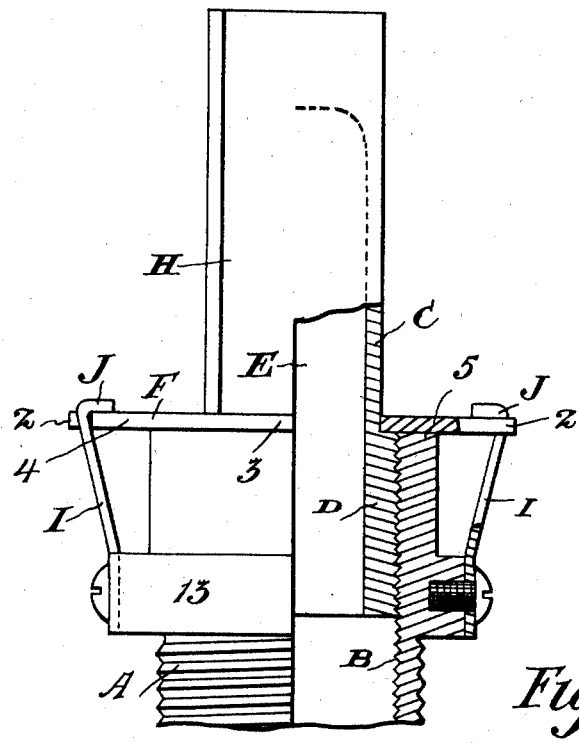
Figure 2:
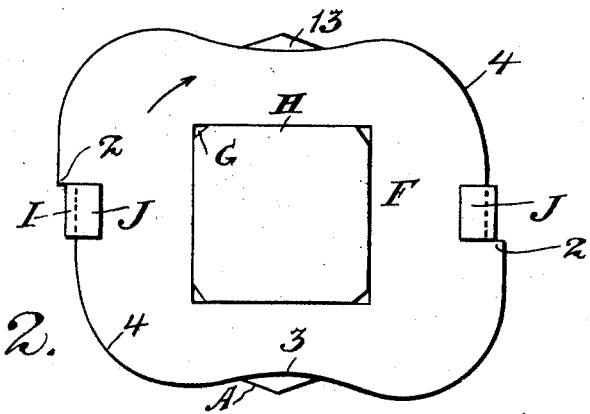

Figure 1 is, in part, a side elevation and a central longitudinal section through my lubricator, and Fig. 2 is a plan view thereof.

In the drawings, like characters of reference refer to the same parts.

While my lubricator may be used on various machines or engines, I have chiefly designed it for use with locomotives where it will be particularly located on the side and main rods thereof where it is subjected to a great deal of vibration. As will hereinafter appear, I have improved the construction of this class of lubricator so as to nullify the effects of vibrations.

A is a grease cup, and the same is externally threaded so that it may be screwed into any desired member designed to carry the same. This cup is of course chambered to receive the grease, and is internally threaded as is shown at B. C is a grease plug the inner end D of which is externally threaded to co-act with the thread B. If desired, the plug C may be chambered as shown at E to increase the carrying capacity of the lubricator. F is a plate having a more or less central aperture G corresponding substantially to the shape of the stem H of the plug C. The plate F co-acts with resilient means carried by the nut 13 (which nut is associated with the cup A, preferably being integrally formed therewith), so as to prevent the separation of the plug C from the cup A. The preferred construction of the means in question comprises one or more resilient dogs I suitably coupled to the nut 13 on opposite sides of the lubricator. The outer end of each dog is hook-shaped as shown at J to over-hang the plate F to retain this plate in functional relationship therewith. The periphery of the plate F is provided with two shoulders 2, oppositely positioned which form stops which come in contact with the dogs I and so prevent the slackening off of the plug C.

When it is desired to remove the plug C, the same is turned in the direction indicated by arrow in Fig. 2 so as to bring the recessed edges 3 of the plate F opposite the dogs I. The depth of these recesses is sufficient to allow the plate to clear the hook-shaped ends J of the dogs I and be withdrawn from the stem H. The plug C may then be manipulated as required.

The plug C is replaced with the recesses 3 positioned as described, and then the stem H is turned to bring the plate F into the position shown in the drawings.

The corners 4 of the plate F are rounded so as to permit of the releasing and replacing movements of the plate F around the axis of the lubricator.

The plate F will be located between the hooks J and the outer end 5 of the grease cup A, and if the lubricator be used in a vertical position the said plate will normally rest upon the end 5.

The construction disclosed is very simple, and the plate F adapted to co-act with the dogs may be in many cases readily mounted for use on existing lubricators without much trouble.

Various changes in construction may be made in that disclosed without going outside the scope of my invention, and the disclosure herein is to be considered exemplary only.

What I claim is:

1. In a lubricator, in combination a grease cup provided with an internal thread; a plug, in part, externally threaded and adapted to co-act with said cup to feed the grease; a removable plate having a substantially central aperture shaped to conform to the shape of the external stem of said plug so that these parts cannot independently move to any considerable extent around the axis of the lubricator, and resilient means externally carried by said grease cup and adapted to co-act with said plate to prevent the slackening off of said plug, and to permit of the removal of same from the said plug when desired.

2. In a lubricator, in combination a grease cup provided with an internal thread; a plug, in part, externally threaded and adapted to co-act with said cup to feed the grease; a removable plate having a substantially central aperture shaped to conform to the shape of the external stem of said plug so that these parts cannot independently move to any considerable extent around the axis of the lubricator; a pair of resilient dogs externally carried by said cup on opposite sides thereof and each having an in-turned hook-shaped end which overhangs said plate; the periphery of said plate being rounded in opposite corners and recessed in opposite sides, and further provided with stops to co-act with said dogs, for the purpose specified.

WILLIAM McCRAE THURSBY.